United States Patent Office.

JOHN L. STEWART AND JAMES L. HASTINGS, OF PHILADELPHIA, PENNSYLVANIA, ASSIGNORS, BY MESNE ASSIGNMENTS, TO THE WELSBACH INCANDESCENT GAS LIGHT COMPANY, OF JERSEY CITY, NEW JERSEY.

PLASTIC MINERAL COMPOSITION, &c.

SPECIFICATION forming part of Letters Patent No. 396,306, dated January 15, 1889.

Application filed November 12, 1885. Serial No. 182,612. (No specimens.)

*To all whom it may concern:*

Be it known that we, JOHN L. STEWART and JAMES L. HASTINGS, citizens of the United States, residing at Philadelphia, in the county of Philadelphia, State of Pennsylvania, have invented certain new and useful Improvements in Plastic Mineral Composition and Vitreous Crystalline Compounds, of which the following is a specification.

This invention relates to a new plastic mineral composition and vitreous or crystalline compound for use in chemical and other arts and for incandescent illumination, said composition being adapted for molding into articles of various forms and for coating metallic and other articles to protect them from the oxidizing and corroding influences of air, moisture, acids, &c., and from injury by heat. The plastic compound when properly burned or fired is highly refractory, very hard, crystalline in structure, rough on the surface, white or opalescent, and practically infusible.

The object of the invention is to produce a readily-incandescing compound capable of resisting the action of intense heat and particularly adapted for forming incandescent burners or attachments for burners for illumination with coal-gas, water-gas, or natural gas. The plastic compound is formed of a mixture of ingredients in about the following proportions: celestine or strontia sulphate, one hundred and thirty-one grains; magnesia carbonate, ninety-six grains; silica or silicic acid, fifteen grains; carbonate of soda, twenty-four grains; carbonate of potassa, thirty-two grains. The carbonates of soda and potassa are first fused and pulverized and then added to the other ingredients.

The materials are ground dry or in oil or water or glycerine, and the resulting pulverized material is intimately mixed in glycerine or its equivalent to the proper consistency for convenient handling or application. The mixture of ingredients having been properly effected, the compound is molded into the desired articles or coated upon articles of metal or other material, and in such forms is subjected to a suitable temperature to drive off the moisture or volatile matter and then to a high temperature in a gas or other furnace, and may afterward be suspended in a gas-flame or placed in burning gas in the open air for completing the process of burning and for testing and proving the finished articles.

The proportions of mineral ingredients above mentioned for forming the compound and various forms of burner attachments for illumination with gas give satisfactory results; but we do not limit ourselves to the proportions stated, as other proportions will give good results and may be varied without departing from our invention.

It is to be noted that the mineral ingredients may be pulverized in the dry condition and the glycerine or the hydrocarbon or other oil afterward added.

Having described our invention, what we claim, and desire to secure by Letters Patent, is—

1. A composition for forming a refractory compound, consisting of celestine or strontia sulphate, magnesia carbonate, silica or silicic acid, carbonates of soda and potassa, and a suitable moistening-fluid.

2. A refractory crystalline compound composed of celestine or strontia sulphate, magnesia carbonate, silica or silicic acid, and carbonates of soda and potassa, said compound being white or opalescent, rough on the surface, and practically infusible.

In testimony whereof we affix our signatures in presence of two witnesses.

JOHN L. STEWART.
JAMES L. HASTINGS.

Witnesses:
CHAS. MATHEWS, Jr.,
ALBERT MATHEWS.